United States Patent
Ezumi et al.

(12) 
(10) Patent No.: US 6,622,904 B2
(45) Date of Patent: *Sep. 23, 2003

(54) FRICTION STIR BONDING METHOD

(75) Inventors: Masakuni Ezumi, Kudamatsu (JP); Kazushige Fukuyori, Kudamatsu (JP)

(73) Assignee: Hitachi, Ltd., Tokyo (JP)

( * ) Notice: Subject to any disclaimer, the term of this patent is extended or adjusted under 35 U.S.C. 154(b) by 36 days.

This patent is subject to a terminal disclaimer.

(21) Appl. No.: 09/791,675

(22) Filed: Feb. 26, 2001

(65) Prior Publication Data

US 2002/0060238 A1 May 23, 2002

(30) Foreign Application Priority Data

Nov. 17, 2000 (JP) ........................................ 2000-350411

(51) Int. Cl.⁷ ............................................... B23K 20/12
(52) U.S. Cl. .................................................... 228/112.1
(58) Field of Search ............................... 228/112.1, 2.1, 228/160, 114.5, 119, 234.1; 156/73.5

(56) References Cited

U.S. PATENT DOCUMENTS

| | | | |
|---|---|---|---|
| 5,893,507 A | | 4/1999 | Ding et al. |
| 6,050,474 A | * | 4/2000 | Aota et al. ................. 156/73.5 |
| 6,237,835 B1 | * | 5/2001 | Litwinski et al. ......... 228/112.1 |
| 6,378,754 B2 | * | 4/2002 | Aota et al. ................ 228/112.1 |
| 6,382,498 B2 | * | 5/2002 | Aota et al. ................ 228/112.1 |

FOREIGN PATENT DOCUMENTS

| | | | |
|---|---|---|---|
| EP | 0992314 A2 | | 4/2000 |
| JP | 893189 | * | 1/1999 |

OTHER PUBLICATIONS

Patent Abstracts of Japan, No. 10249553, Sep. 22, 1998.
Patent Abstracts of Japan, No. 11101286, Apr. 13, 1999.
Patent Abstracts of Japan, No. 10193143, Jul. 28, 1998.

* cited by examiner

*Primary Examiner*—Tom Dunn
*Assistant Examiner*—Jonathan Johnson
(74) *Attorney, Agent, or Firm*—Antonelli, Terry, Stout & Kraus, LLP (57) ABSTRACT

A face plate 11 is butted against a frame 520, from which a segment 525 for overlapping with the rear surface of a face plate 21 is projected. The frame 520 includes a raised portion 523. A friction stir welding is performed by inserting a rotary tool 50 into the raised portion 523. The rotary tool 50 is rotated clockwise as seen from the large-diameter portion 51, so that the pressure of fluidized metal is higher at the right-hand side of the axial center of the rotary tool 50. There exists the overlapping surface of the face plate 21 and the projecting segment 525 at the side with high pressure of metal. The raised portion 523 exists at the left-hand side of the axial center of the rotary tool 50. Thus, the occurrence of continuous metal oxide or a notch at the overlapping surface can be restrained.

15 Claims, 5 Drawing Sheets

20: hollow-shaped material
21, 22: face plate
50: rotary tool
51: large-diameter portion
52: small-diameter portion
510: entrance
520: rim material
523: convex portion
525, 527: projecting segment

FIG. 1

| | |
|---|---|
| 20: | hollow-shaped material |
| 21, 22: | face plate |
| 50: | rotary tool |
| 51: | large-diameter portion |
| 52: | small-diameter portion |
| 510: | entrance |
| 520: | rim material |
| 523: | convex portion |
| 525, 527: | projecting segment |

FRICTION STIR BONDING METHOD

FIELD OF THE INVENTION

The present invention relates to a friction stir welding method.

DESCRIPTION OF THE RELATED ART

A friction stir welding method is a technique in which a round shaft (called a rotary tool) is rotated and inserted into the welding region of members to be welded, and the rotating rotary tool is moved along the welding line, thereby heating, mobilizing and plasticising the material in the welding region, to achieve a solid-phase welding of the members. The rotary tool is comprised of a large-diameter portion and the small-diameter portion. The small-diameter portion is inserted into the joint between the members to be welded so that the end surface of the large-diameter portion comes into contact with the aforementioned members. A screw thread is formed on the small-diameter portion.

Moreover, to facilitate the friction stir welding, a raised convex portion is provided on the two members to be welded in the region where the rotary tool is to be inserted, and the small-diameter portion of the rotary tool is inserted into the butted region, so that the large-diameter portion of the rotary-tool is inserted into the raised portions. The gap between the two members is filled using the metal of the raised portions as the source. The raised portion may be formed only on one of the members. This technique is used in a case of friction stir welding members made of extruded materials, at a region where the extruded directions are orthogonalized.

This technique is disclosed in Japanese Patent Laid-open Publication No. 11-90655 (U.S. Pat. No. 6,050,474).

SUMMARY OF THE INVENTION

Figure 8A:
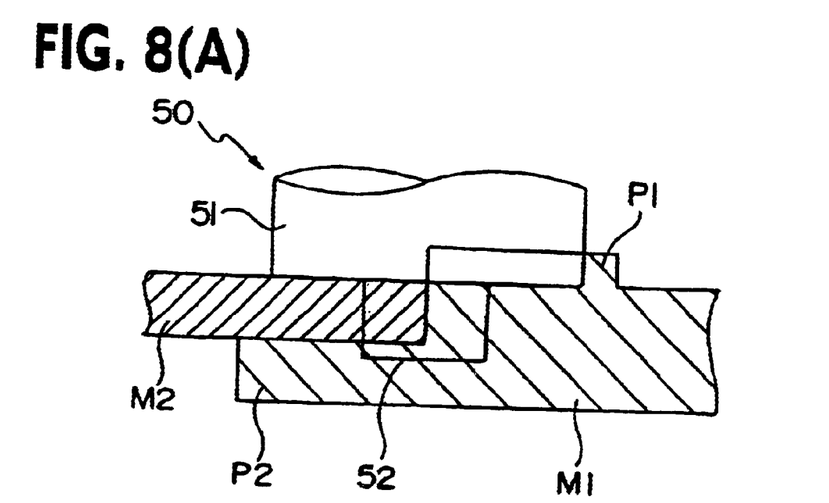
FIG. 8(A) is a longitudinal cross-sectional view of a conventional configuration of an abutting region during friction stir welding.
Figure 8B:
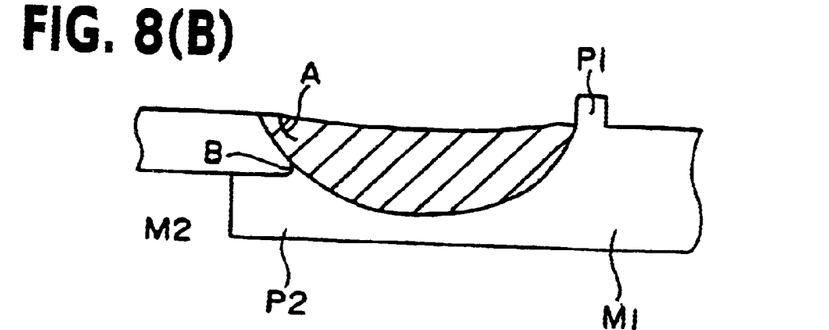
FIG. 8(B) is a longitudinal cross-sectional view of the welded region resulting from the welding in FIG. 8(A).

FIGS. 8(A) and 8(B) are longitudinal cross-sectional views of a friction stir welded region where a member M1 provided with a raised portion P1 is abutted against a member M2 not provided with a raised portion. FIG. 8(A) shows the condition where a rotary tool 50 is inserted into the butted region between the two members M1, M2. FIG. 8(B) is a longitudinal cross-sectional view showing the region after welding, and the hatching indicates the stirred area of the weld. The indication of the stirred area is an exemplification. The rotary tool 50 for friction stir welding is comprised of a large-diameter portion 51 and a small-diameter portion 52 at the leading end thereof. When performing friction stir welding, the small-diameter portion 52 is inserted into the butted region to a level where a part of the large-diameter portion 51 is inserted into the raised portion P1. The leading end of the small-diameter portion 52 is inserted into a projecting segment P2 on which the rear surface of the member M2 rests. The lower end of the large-diameter portion 51 is positioned so as to come into contact with the upper surface of the member M2. When welding is performed, continuous metal oxide A is formed near the surface of the welded region on the side of the member M2 having no raised portion, as indicated in FIG. 8(B). It is considered that this metal oxide A appears at the surface of the member being enwound and not diffused. Also, the surface portion which overlaps with the projecting segment P2 and the member M2 tends to form a notch B extending towards the upper surface side (large-diameter portion Ti side of the rotary tool T). It is considered that the continuous metal oxide A or the notch B deteriorates the strength of the weld.

The object of the present invention is to provide a friction stir welding method that could restrict the occurrence of defects.

As a result of various examinations, it has been formed that the pressure of metal fluidized by the rotation of the rotary tool is not uniform throughout the projected area in the axis direction of the rotary tool, but is different depending on the axial position. In this regard, the position with high pressure is defined by the direction of rotation and the direction of movement of the rotary tool. It is considered that this non-uniformity leads to occurrence of the continuous metal oxide A or the notch B.

The present invention is characterized by the fact that a member with no raised portion is placed in the position where high pressure is provided, which position with higher pressure of the fluidized metal is defined by the direction of rotation and direction of movement of the rotary tool.

DETAILED DESCRIPTION OF PREFERRED EMBODIMENTS

A preferred embodiment of the present invention will now be explained with reference to FIG. 1 through FIG. 6. Referring first to FIG. 6, a car body 500 of a railway car is comprised of a side structure 501 constituting the side surface, a roof structure 502 constituting the roof, an underframe 503 constituting the floor, and an end structure 504 constituting the end portion of the car body in the longitudinal direction. The side structure 501, the roof structure 502, and the underframe 503 are respectively formed by joining and welding plural extruded members 10, 20. The longitudinal direction (extruded direction) of the extruded members 10, 20 is aligned with the longitudinal direction of the car body 500. The extruded members 10, 20 are hollow-shaped members made of an aluminum alloy.

The side structure 501 is provided with a plurality of windows 530, and it is also provided with an entrance 510 for passengers. A door frame 520 is welded to the edge of the opening of the entrance 510. The door frame 520 is formed of a thick member having a high strength. The door frame 520 is made of an extruded aluminum alloy and is bent in a U-shape to form the left and right sides and the upper side of the entrance 510.

The direction of extrusion of the members 10, 20 constituting the side structure 501 is aligned with the longitudinal direction of the car body, that is, the side structure 501. Because the door frame 520 is also formed of an extruded material, the direction of extrusion of the door frame 520 and the direction of extrusion of the members 10, 20 are orthogonal at the region on the left and right sides of the entrance 510. The extruded members 10, 20 are hollow-shaped members.

Figure 5:
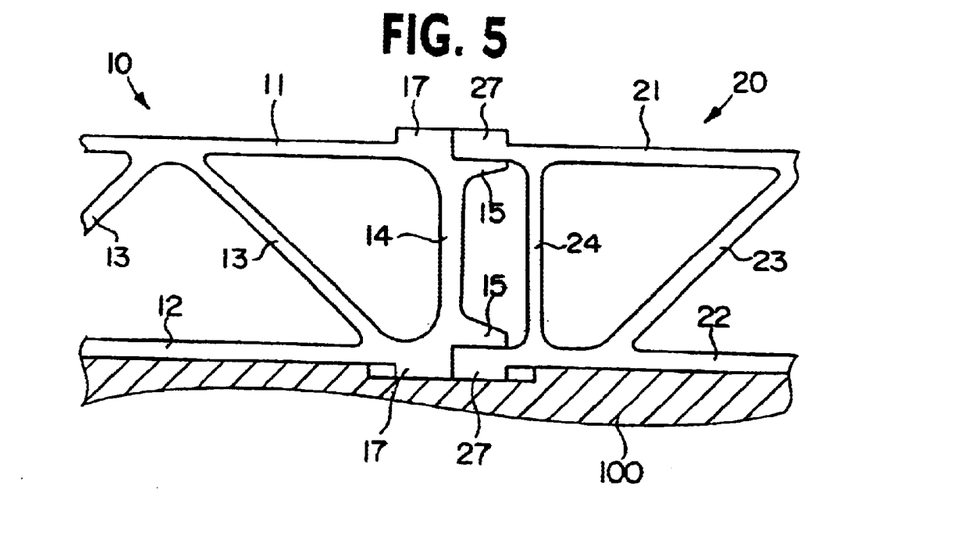
FIG. 5 is a cross-sectional view taken along line V—V in FIG. 4.
Figure 6:
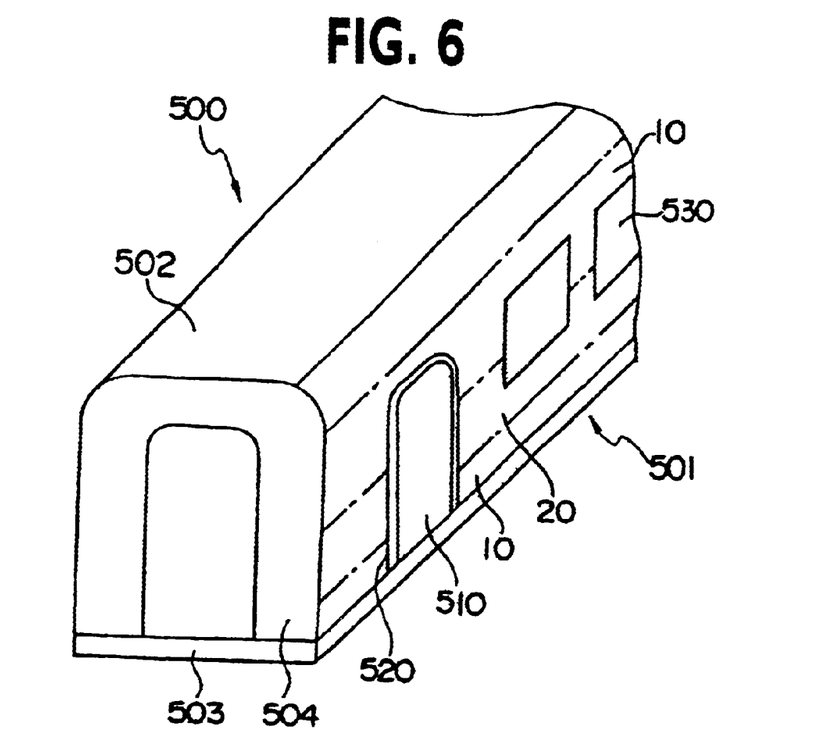
FIG. 6 is a perspective view of a car body of a railway car.

The hollow-shaped member 10 (20), as seen in FIG. 5, is comprised of two substantially parallel face plates 11 (21), 12 (22), and a plurality of connecting plates or ribs 13 (23), 14 (24) connecting the two face plates.

A connecting plate 14 (24) at the end portion in the width direction of the hollow-shaped member 10 (20) is orthogonal to the face plates 11, 12 (21, 22). In the outer surface of the connecting portion, which is formed between the connecting plate 14 and the face plate 11 (12), there is provided a recessed portion for receiving and supporting the face plate 21 (22) of the hollow member 20. The end portions of the hollow-shaped member 10 support the ends of the face plates 21, 22 of the hollow-shaped member 20. There are provided projecting segments 15 for supporting the face plates 21, 22 on the end portions of the face plates 11, 12. The projecting segment 15 projects from the connecting plate 14. The projecting segment 15 forms part of the recessed portion mentioned above.

On the end portions of each of the face plates 11, 12 (21, 22), there is provided a raised portion 17 (27) projecting towards the outside (outside in the thickness direction) of the hollow-shaped members 10, 20. The end surfaces of the raised portions 17 (that is, the raised portions at the end of the face plates 11, 12) are located at approximately the center of the thickness of the connecting plate 14. The end surfaces of the raised portions 17 of the hollow-shaped member 10 are abutted against the end surfaces of the raised portions 27 of the hollow-shaped member 20.

The face plate 11 (12) and the face plate 21 (22) are disposed in the same plane, and the extent of the projection of the raised portions 17, 27 are equal. The width of the two raised portions 17, 27 are equal, and the total width of the two raised portions is larger than the diameter of the large-diameter portion 51 of the rotary tool 50. The metal of the raised portions 17, -27 becomes the source of metal for filling the gap in the butted region between the two members 10, 20.

Referring to FIG. 5, an example of the welding of members 10, 20 will be explained. Before welding, the two hollow-shaped members 10, 20 are placed on a base 100 and are fixed thereto. The rotary tool 50 is provided with a small-diameter portion 52 at the leading end of a large-diameter portion 51. The small-diameter portion 52 is provided with a screw thread. To perform welding, the rotary tool 50 is inserted into the butted region between the members 10, 20 until the lower end of the large-diameter portion 51 is inserted into the raised portions 17, 27. The small-diameter portion 52 is inserted into the butted region between the face plates 11, 21. The lower end of the small-diameter portion 52 is inserted slightly into the projecting segment 15. The rotating rotary tool 50 is moved along the welding line of the butted region. The raised portions 17, 27 become the source for filling the gap in the butted region between the members 10, 20.

When the friction stir welding on the upper surface side, as is illustrated in FIG. 5, is completed, the hollow-shaped members 10, 20 are turned upside down, and friction stir welding is performed again on the other side in a similar manner.

When all of the hollow-shaped members 10, 20 constituting the side structure 501 have been welded together, the structure is placed with the inner side of the car upward, and unnecessary portions which constitute the openings, such as the window 530 or the entrance 510, are removed by cutting. The end portion of the face plate 21 (11) at the outer side of the car is more projected towards the opening than the end portions of the face plate 22 (12) at the inner side of the car or the connecting plates 23 (24, 13, 14) . Next, the side structure 501, processed as mentioned above, is joined with the door frame 520, which is bent in a U-shape.

Figure 1:
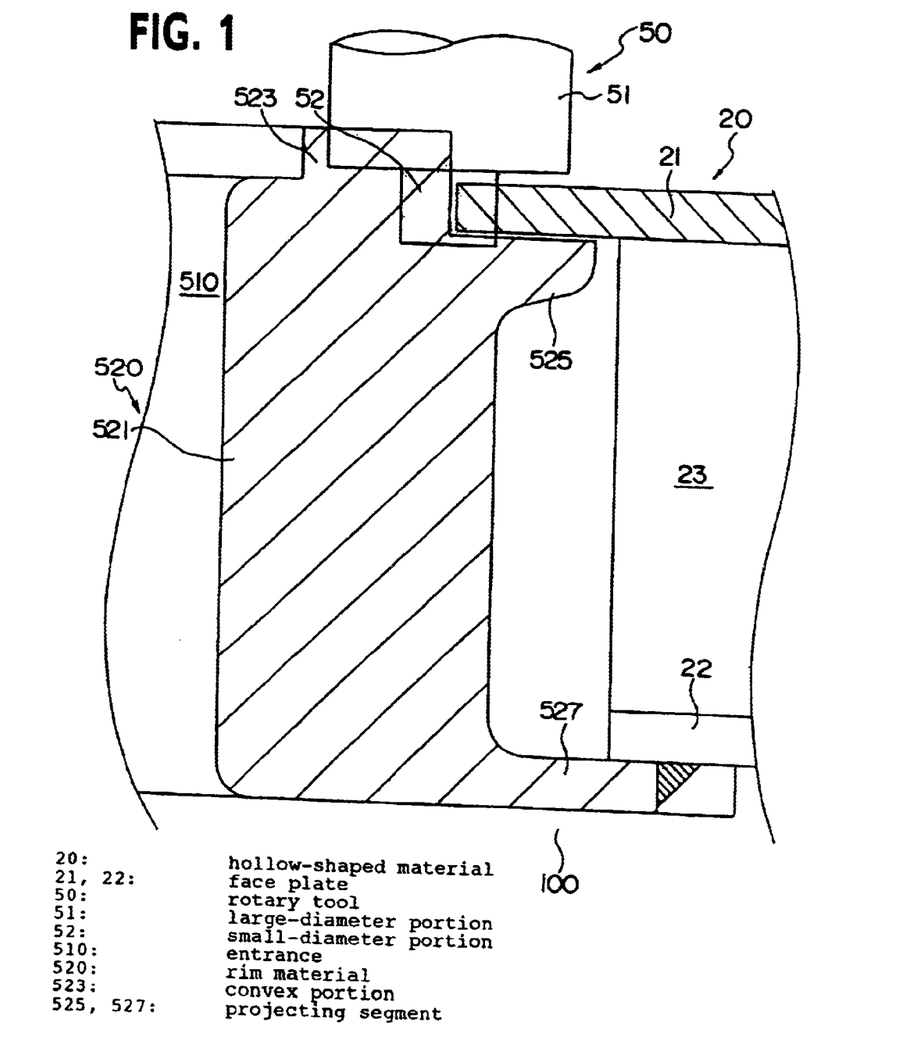
FIG. 1 is a longitudinal cross-sectional view of the rim material and the hollow-shaped members according to an embodiment of the present invention during welding.

Next, the door frame 520 of the entrance 510 is friction stir welded to the structure formed by the hollow-shaped members 10, 20. In FIG. 1, the door frame 520 bent in a U-shape is placed in the opening for the entrance 510. The door frame 520 is comprised of a segment 521 for closing the end portions of the hollow-shaped members 10, 20, a raised portion 523 projecting outwardly from the outer surface of the face plate 21 (11) at the outside of the car, a projecting segment 525 on which the inner surface of the face plate 21 (11) is supported, and a projecting segment 527 on which the outer surface of the face plate 22 (12) at the inner side of the car is supported. The end surface at the outside of the car of the segment 521, excluding the raised portion 523 lies in substantially the same plane with the outer surface of the face plate 21 (11) . The projecting segment 525 at the outer side of the car is in a position displaced from the outer side of the car. The end portion of the face plate 21 (11) is abutted against the door frame 520.

The butted region is friction stir welded from above. The door frame 520 is fixed to the base 100. The end portions of the face plates 21, 11 abutted against the door frame 520 are the end portions in the extruded direction, therefore there exists no raised portions 17, 27 on the face plates 11, 21. The hollow-shaped member 10 coming into contact with the central segment 520C of the U-shaped door frame 520 is cut at the end portion in the width direction, therefore no raised portion exists thereon.

Next, the butted region between the face plate 21 (11) and the door frame 520 is friction stir welded from above. The small-diameter portion 52 of the rotary tool 50 is inserted into the butted region. The leading end of the small diameter portion 52 is inserted into the projecting segment 525. A part of the large-diameter portion 51 is inserted into the raised portion 523. The large-diameter portion 51 is inserted so as to form a slight gap between the lower end of the large-diameter portion 51 and the upper surface of the face plate 21 (11). The rotary tool 50 is inserted at an angle so that the large-diameter portion 51 is inclined rearward relative to the direction of movement, and so that there exists a gap between the lower most end of the large-diameter portion 51 and the upper surface of the face plate 21 (11).

Figure 2:
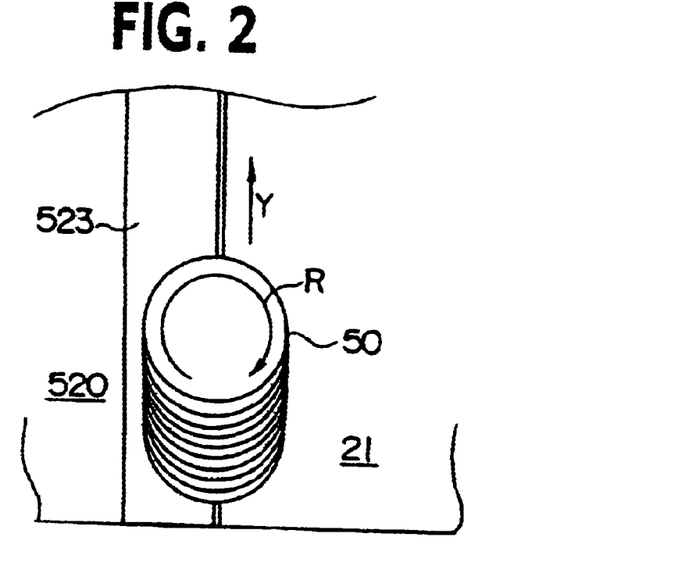
FIG. 2 is a top plane view of FIG. 1.

After inserting the rotary tool 50 into the region to be welded as mentioned above, the rotary tool 50 is rotated and moved along the welding line. The rotary tool is moved in FIG. 1 from the near side of the paper towards the far side of the paper. In FIG. 2, which is a top plane view of FIG. 1, Y represents the direction of movement of the rotary tool 50, and R represents the direction of rotation of the rotary tool 50. The screw thread of the small-diameter portion 52 is a left-hand screw. When looking at the rotary tool 50 from the large-diameter portion 51 side, the direction of rotation of the rotary tool 50 is clockwise. As is illustrated in FIG. 1, the raised portion 523 is located on the left-hand side of the axial center of the rotary tool 50, and the projecting segment 525 extends to the right-hand side thereof, when looking forward from the rotary tool 50 in the direction of movement. The center of rotation of the rotary tool 50 is inclined. The axial center of the large-diameter portion 51 is positioned rearward relative to the axial center of the small-diameter portion 52, in the direction of movement.

Figure 4:
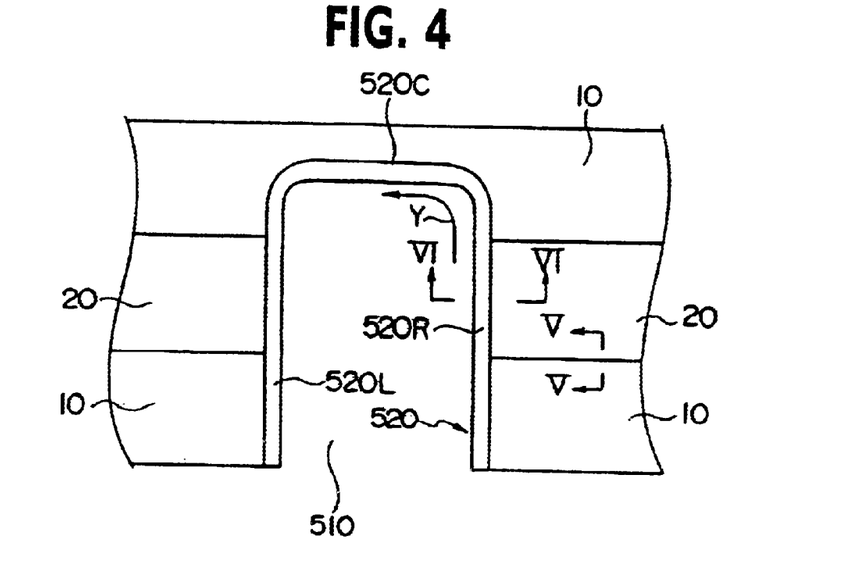
FIG. 4 is a front view of the side structure of a car body of a railway car according to one embodiment of the present invention.

In FIG. 4, the rotary tool 50 is first inserted into the butted region at the lower end of the right segment 520R of the U-shaped door frame 520, and movement is started therefrom. The rotary tool 50 moves from the right segment 520R towards the center segment 520C, and then from the center segment 520C to the left segment 520L. Lastly, the rotary tool arrives at the lower end of the left segment 520L, at which point welding is completed.

In the friction stir welding, the metal of the raised portion 523 is moved to the upper surface side of the face plate 21 (11), and also becomes the source for filling the gap in the butted region between the face plate 21 (11) and the door frame 520.

After completing the friction stir welding, the welded region or the remainder of the raised portion 523 which projects above the outer surface of the face plate 21 (11) are cut with a grinder. After completing the friction stir welding, or before completion, the projecting segment 527 and the face plate 22 (12) are fillet welded.

Figure 3:
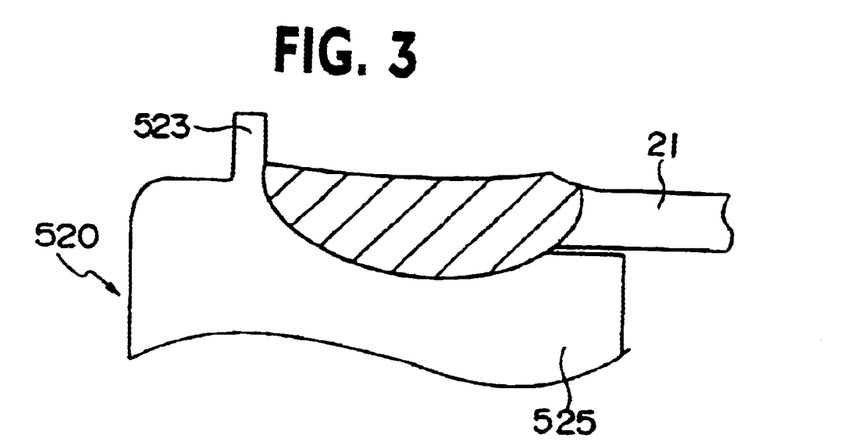
FIG. 3 is a longitudinal cross-sectional view of the weld after the welding has been completed in FIG. 1.

With such a method, the continuous metal oxide A conventionally formed in the vicinity of the upper surface of the welded region is decreased or eliminated, as is shown in FIG. 3. Also, the notch B formed at the overlapping surface between the projecting segment 525 and the face plate 21 (12) is diminished or eliminated. The hatching in FIG. 3 indicates the stirred region. The stirred region is an exemplification.

It is considered that the pressure of metal at the welded region fluidized by the rotary tool 50 is larger on the right-hand side of the axial center of the rotary tool than the left-hand side, as seen in the direction of movement of the rotary tool. It is considered that this results from the non-welded metal at the front of the rotary tool 50 being shifted to the right-hand side, as the rotary tool 50 is rotated clockwise. It is considered that this is the reason why the continuous metal oxide A is reduced or eliminated, even though there exists a welding region with the face plate 21 (11) on the right-hand side of the rotary tool. Moreover, it is considered that this is the reason why the notch B is diminished or eliminated at the overlapping surface, even though there exists an overlapping surface on the right-hand side of the rotary tool.

On the other hand, the pressure on the left-hand side of the rotary tool 50 is lower than on the right-hand side. It is considered that this is because there exists no non-welded metal at the rear side of the rotary tool 50, so that no new metal is supplied to the left-hand side. Therefore, the Continuous metal oxide A is reduced or eliminated at the left-hand side. Also, there exists no overlapping surface on the left-hand side.

In the case where the screw thread of the small-diameter portion 52 is a right-hand screw, the direction of rotation becomes counterclockwise. The high-pressure region in this case is formed on the left-hand side of the axial center, when looking in the direction of movement of the rotary tool 50. Therefore, the structure is positioned so that the overlapping surface exists on the left-hand side, and the raised portion 527 exists on the right-hand side, opposite to that shown in FIG. 1. That is, the rotary tool 50 is moved from the left segment 520L of the door frame 520 to the right segment 520R via the center segment 520C.

The embodiment illustrated in FIG. 7 will now be explained. A raised portion 123 is provided at the surface side of an end portion of a plate 111. A projecting segment 125 extends in parallel to the plate 121 from the leading end of the raised portion 123. A projecting segment 127 extends in parallel to the projecting segment 125 from the rear surface of the plate 121. A plate 131 is inserted between the two projecting segments 125, 127, and is abutted against the plate 121. The end portion of the face plate 121 is abutted against the end portion of a face plate 111. The lower end of the large-diameter portion 51 of the rotary tool 50 is placed inside the raised portion 123 and the projecting segment 125.

Figure 7:
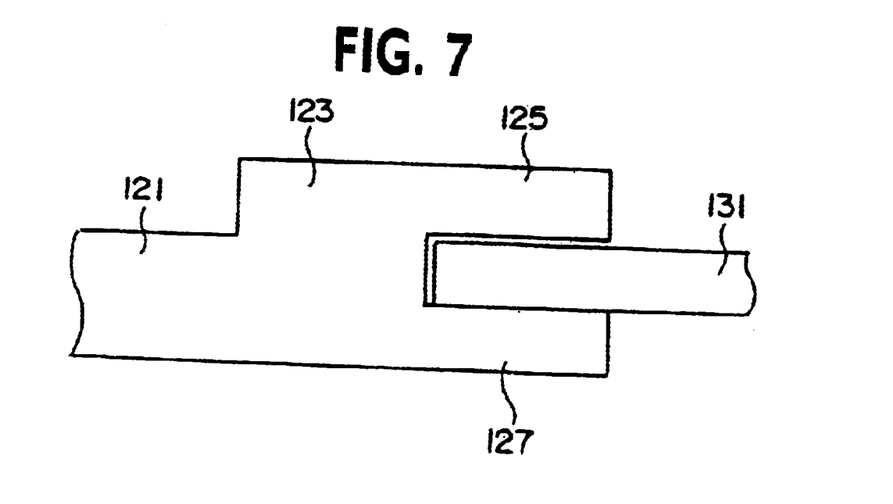
FIG. 7 is a longitudinal cross-sectional view of the welded region in accordance with another embodiment of the present invention.

In the embodiment of FIG. 7, the projecting segments 125, 127 may be eliminated. When the projecting segment 127 is eliminated, only the occurrence of the continuous metal oxide can be restrained.

The technical scope of the present invention is not limited to the terms used in the claims or in the summary of the present invention, but is extended to a range in which a person skilled in the art could easily find equivalents based on the present disclosure.

The present invention makes it possible to carry out friction stir welding in which the occurrence of defects cam be restrained.

We claim:

1. A friction stir welding method comprising the steps of:
   butting an end portion of a first plate against an end portion of a second plate, which second plate has a raised portion projecting beyond one surface of said second plate, said raised portion being projected in the thickness direction of said plate from one surface of the butted end portion of said first plate; and
   performing friction stir welding using a rotary tool including a small-diameter portion at the leading end of a large-diameter portion, by inserting said small-diameter portion into the butted region at said first plate and said second plate; wherein
   a part of said large-diameter portion is inserted into said raised portion;
   said rotary tool is rotated clockwise and moved relatively along said butted region, as seen from said large-diameter portion side;
   said second plate is positioned rightwards from the axial center of said rotary tool, as seen in said direction of movement;
   said raised portion is positioned leftwards from the axial center of said rotary tool; and
   no raised portion is placed in a region of the friction stir welding where higher pressure of the fluidized metal, during the friction stir welding, occurs, said region where higher pressure of fluidized metal occurs being defined by the direction of rotation and of movement of the rotary tool.

2. A friction stir welding method according to claim 1, wherein:
   the other surface of said end portion of said first plate includes a projecting segment projecting towards said second plate substantially in parallel with said second plate;
   said projecting segment overlaps the rear surface of said end portion of said second plate, as seen from said large-diameter portion side of said rotary tool; and
   friction stir welding is performed while a part of the leading end of said small-diameter portion is inserted into said projecting segment.

3. A friction stir welding method according to claim 1, wherein:
   said first plate and said second plate are formed of extruded materials, respectively;
   the direction of extrusion of said second extruded material is arranged so as to be substantially orthogonal to the direction of extrusion of said first extruded material; and
   friction stir welding performed in such state.

4. A friction stir welding method comprising the steps of:
   butting an end portion of a first plate against an end portion of a second plate, which second plate has a raised portion projecting beyond one surface of said second plate, said raised portion being projected in the thickness direction of said plate from one surface of the butted end portion of said first plate; and
   performing friction stir welding using a rotary tool including a small-diameter portion at the leading end of a large-diameter portion, by inserting said small-diameter portion into the butted region of said first plate and said second plate; wherein
      a part of said large-diameter portion is inserted into said raised portion;
      said rotary tool is rotated counter-clockwise and moved relatively along said butted region, as seen from said large-diameter portion side;
      said second plate is positioned leftwards from the axial center of said rotary tool, as seen in said direction of movement; and
      said raised portion is positioned rightwards from the axial center of said rotary tool.

5. A friction stir welding method according to claim 4, wherein:
   the other surface of said end portion of said first plate includes a projecting segment projecting towards said second plate substantially in parallel with said second plate;
   said projecting segment overlaps the rear surface of said end portion of said second plate, as seen from said large-diameter portion side of said rotary tool; and
   friction stir welding is performed while a part of the leading end of aid small-diameter portion is inserted into said projecting segment.

6. A friction stir welding method according to claim 4, wherein:
   said first plate and said second plate are formed of extruded materials, respectively;
   the direction of extrusion of said second extruded material is arranged so as to be substantially orthogonal to the direction of extrusion of said first extruded material; and
   friction stir welding is performed in such state.

7. A method of producing a railway car comprising the steps of:
   butting an end portion of a first extruded member against an end portion of a second extruded member,
   a side structure of said railway car being formed using said first extruded member and said second extruded member as a portion thereof;
   a rim of an opening of said railway car being formed using said first extruded member, said first extruded member including a raised portion projecting to an outer side of the car from one surface of said first extruded member, and a projecting segment projecting from the other surface thereof towards said second extruded member substantially in parallel to said second extruded member;
   overlapping said end portion of said second extruded member on said projecting segment; and
   friction stir welding using a rotary tool including a small-diameter portion at the leading end of a large-diameter portion, by inserting said small-diameter portion into the butted region of said first and second extruded members; wherein
      a part of said large-diameter portion is inserted into said raised portion;
      said rotary tool is rotated clockwise and moved relatively along said butted region, as seen from said large-diameter portion side;
      said second extruded member and said projecting segment are positioned rightwards from the axial center of said rotary tool, as seen in said direction of movement;
      said raised portion is positioned leftwards from the axial center of said rotary tool;
      a part of the leading end of said small-diameter portion is inserted into said projecting segment; and
      no raised portion is placed in a region of the friction stir welding where higher pressure of the fluidized metal, during the friction stir welding, occurs, said region where higher pressure of fluidized metal occurs being defined by the direction of rotation and of movement of the rotary tool.

8. A method of producing a railway car according to claim 7, wherein:
   said rim is a frame formed of said first extruded member configured so as to have at least three sides; and
   said rotary tool is moved from the right side of said rim to the center side, and then to the left side in order to precedence, as seen from the outer side of the car.

9. A method of producing a railway car comprising the steps of:
   butting an end portion of a first extruded member against an end portion of a second extruded member,
   a side structure of said railway car being formed using said first extruded member and said second extruded member as a portion thereof,
   a rim of an opening of said railway car being formed using said first extruded member, said first extruded member including a raised portion projecting to an outer side of the car from one surface of said first extruded member, and a projecting segment projecting from the outer surface thereof towards said second extruded member substantially in parallel to said second extruded member;
   overlapping a plate of said second extruded member on said projecting segment; and
   friction stir welding using a rotary tool including a small-diameter portion at the leading end of a large-diameter portion, by inserting said small-diameter portion into the butted region of said first and second extruded members; wherein
      a part of said large diameter portion is inserted into said raised portion;
      said rotary tool is rotated counter-clockwise and moved relatively along said butted region, as seen from said large-diameter portion side;
      said second extruded member and said projecting segment are positioned leftwards from the axial center of said rotary tool, as seen in said direction of movement;
      said raised portion is positioned rightwards from the axial center of said rotary tool; and a part of the leading end of said small-diameter portion is inserted into said projecting segment.

10. A method of producing a railway car according to claim 9, wherein:
said rim is a frame formed of said first extruded member configured so as to have at least three sides; and
said rotary tool is moved from the left side of said rim to the center side, and then to the right side in order of precedence, as seen from the outer side of the car.

11. A friction stir welding method according to claim 1, wherein said second plate forms part of a hollow-shaped member.

12. A friction stir welding method according to claim 1, wherein said small-diameter portion has a left-hand screw thread.

13. A friction stir welding method according to claim 4, wherein no raised portion is placed in a region of the friction stir welding where higher pressure of the fluidized metal, during the friction stir welding, occurs, said region where higher pressure of fluidized metal occurs being defined by the direction of rotation and of movement of the rotary tool.

14. A friction stir welding method according to claim 4, wherein said small-diameter portion ha a right-hand screw thread.

15. A method of producing a railway car according to claim 9, wherein no raised portion is placed in a region of the friction stir welding where higher pressure of the fluidized metal, during the friction stir welding, occurs, said region where higher pressure of fluidized metal occurs being defined by the direction of rotation and of movement of the rotary tool.

* * * * *